United States Patent [19]

Benson et al.

[11] 4,173,611

[45] Nov. 6, 1979

[54] PROCESS FOR FEEDING A MOVING WEB TO A STENTER APPARATUS

[75] Inventors: Nigel C. Benson, Ickleford; John M. F. Hughes; Denis Kingslake, both of Stevenage; David G. Symonds, Hatfield, all of England

[73] Assignee: Imperial Chemical Industries Limited, London, England

[21] Appl. No.: 816,192

[22] Filed: Jul. 15, 1977

[30] Foreign Application Priority Data

Apr. 5, 1977 [GB] United Kingdom ............... 14315/77

[51] Int. Cl.² ......................... B29B 5/04; B65H 17/18
[52] U.S. Cl. ....................................... 264/138; 26/89; 226/4; 226/110; 226/172; 264/37; 264/145; 264/148; 264/160; 425/305.1; 264/290.2
[58] Field of Search ................. 264/288, 289, 37, 40.1, 264/40.7, 141, 140, 144, 210 R, 216, 138, 14 S, 148, 160; 226/4, 110, 172; 26/89, 74; 425/44 S, 305.1; 83/13, 23, 27, 155.1

[56] References Cited

U.S. PATENT DOCUMENTS

| | | | |
|---|---|---|---|
| 3,014,234 | 12/1961 | Koppehele | 26/72 |
| 3,370,111 | 2/1968 | Boone | 264/289 |
| 3,471,606 | 10/1969 | Corbett et al. | 264/289 |
| 3,515,328 | 6/1970 | Smith, Jr. | 226/172 |
| 3,976,237 | 8/1976 | Bossons | 226/172 |
| 4,007,078 | 2/1977 | Aoki | 156/159 |
| 4,038,121 | 7/1977 | Benson et al. | 264/210 R |

FOREIGN PATENT DOCUMENTS

| | | | |
|---|---|---|---|
| 983063 | 2/1976 | Canada | 226/110 |
| 2451713 | 5/1975 | Fed. Rep. of Germany | 425/148 |

*Primary Examiner*—James B. Lowe
*Attorney, Agent, or Firm*—Cushman, Darby & Cushman

[57] ABSTRACT

A process and apparatus for introducing a moving web to a stenter apparatus at the commencement of the stenter apparatus operation comprises gripping and transporting the web between at least two belt conveyors which are driven at a linear speed substantially equal to the linear speed of the edge grips of the stenter apparatus, transferring the moving web into the moving edge grips of the stenter apparatus, and disengaging the belt conveyors from gripping and transporting contact with the moving web when continuous web transportation through the stenter apparatus has been established. Useful in processes for the production of oriented and heat-set thermoplastics films such as polyethylene terephthalate films for feeding the film to the stenter apparatus at the beginning of the film production process or if a malfunction necessitating re-feeding occurs in the stenter apparatus. Preferably incorporates means for feeding the film to a dump until re-feeding can occur, then severing the film and re-feeding.

7 Claims, 10 Drawing Figures

PROCESS FOR FEEDING A MOVING WEB TO A STENTER APPARATUS

The present invention relates to a process and apparatus for feeding a moving web to a stenter apparatus.

Processes for the continuous production of webs such as molecularly oriented and heat-set thermoplastics films employ stentor apparatus comprising means for gripping the edges of the web during its transportation through the apparatus. In the production of molecularly oriented and heat-set films, the edge grips often comprise a plurality of clamps which are transported around endless tracks located at each edge of the film. Such clamps engage the film edges so strongly that the film is retained in the clamps even when subjected to tension during orientation and/or heat setting. At the commencement of the operation carried out in such a stenter apparatus it is necessary to feed the moving web into the clamps whilst they are in motion around the endless tracks. It has been customary to feed the web to the moving clamps manually. Such an operation can be hazardous particularly at higher linear web speeds.

According to the present invention a process for introducing a moving web to a stenter apparatus at the commencement of the stenter apparatus operation comprises gripping and transporting the web between at least one belt conveyor located on one side of the moving web and at least one other belt conveyor located on the other side of the moving web, the belt conveyors being driven at a linear speed substantially equal to the linear speed of the edge grips of the stenter apparatus, transferring the moving web into the moving edge grips of the stenter apparatus, and disengaging the belt conveyors from gripping and transporting contact with the moving web when continuous web transportation through the stentor apparatus has been established.

The invention also relates to an apparatus for introducing a moving web to a stentor apparatus at the commencement of the stenter apparatus operation which comprises at least one belt conveyor located on one side of the moving web and at least one other belt conveyor located on the other side of the moving web, the belt conveyors being engageable with the moving web and arranged to grip and transport the web into the edge grips of the stenter apparatus, the belt conveyors being drivable at a linear speed substantially equal to the linear speed at which the edge grips of the stenter apparatus are driven and also being arranged to be disengaged from gripping and transporting contact with the moving web when continuous web transportation through the stenter apparatus has been established by retracting one or both of the conveyors from the moving web.

It is to be understood that the invention is concerned with the introduction of a moving web to a stentor apparatus not only at the beginning of the operation which is to be carried out in the stenter apparatus but also at an intermediate stage in such an operation whenever a malfunction such as web splitting occurs in the stenter apparatus which may necessitate a fresh introduction of the web to the apparatus to re-establish the process.

The belt conveyors should preferably extend into the stenter apparatus such that they are located inwardly of the paths of the stenter edge grips. The edge margins of the web should extend beyond the edges of the belt conveyors so that they feed into and are gripped by the stenter edge grips. The edges of the belt conveyors are preferably located as close as possible to the stenter edge grips, e.g. less than 5 cm from the grips, to provide optimum control over the unsupported edge margins of the web which extend beyond the edges of the belt conveyors immediately prior to their engagement with the stentor edge grips. One pair of belt conveyors comprising a belt conveyor located above and below the web may extend across substantially the whole width of the web with the exception of the unsupported edge margins. Alternatively, pairs of belt conveyors each comprising a belt conveyor located above and below the web may be located adjacent the web edges. Such conveyors may be from 5 to 50 cm wide.

The unsupported edge margins of the web which extend beyond the edges of the belt conveyors may be guided by suitable means such as guide plates extending up to the entry of the web into the stenter edge grips. The provision of such guide means is particularly desirable when the edges of the web are susceptible to curling.

The belt conveyors may be produced from any suitable material which is resistant to deformation and stretching during the transportation of the moving web and may for example comprise a woven fabric faced with a material which grips the web, e.g. a rubber-covered belt. The surface of the facing material may be embossed with a pattern to enhance the grip of the belt conveyor on the moving web.

Since the apparatus and process of the invention are employed only to establish the passage of the moving web through the stentor apparatus the belt conveyors are arranged to be disengaged from the moving web after the web has been fed into the stentor grips and efficient continuous transportation of the web through the stenter apparatus has been established. One or both belt conveyors may for example be retracted from engagement with the moving web, e.g. one of the conveyors may be retracted by means of pneumatic or hydraulic rams, permitting the web to lift out of engagement with the other belt conveyor under the tension in the web.

Conventional processes for the orientation and heat setting of flat thermoplastics films often include process operations prior to operations which are effected in a stenter apparatus, subsequent operations in the stenter apparatus comprising for example transverse stretching and heat setting. For example linear polyester films such as polyethylene terephthalate films are normally oriented longitudinally by stretching over sets of slow and fast drawing rollers before transverse orientation by stretching in a stenter apparatus followed by heat setting in another stenter apparatus. In such a film production process, the feeding process and apparatus of the present invention is not only useful for feeding the film through the apparatus at the commencement of the stretching and heat-setting process but also for re-establishing the process if a malfunction such as film splitting occurs in either stenter apparatus. In such circumstances it is possible according to this invention to rectify the malfunction in the stenter apparatus by re-feeding the film from the previous longitudinal stretching stage into the stenter apparatus using the process and apparatus of the invention, thereby avoiding the need to interrupt the continuity of the whole process. The use of such a procedure requires the path of the longitudinally stretched film to be deflected to a dump location, e.g. a receptacle for the film, or means for cutting the film into small pieces suitable for recycling, whilst the malfunction in the stenter apparatus is rectified and until the apparatus is in a condition for re-threading.

Accordingly, such an operation may be effected by severing the web, e.g. with a knife, prior to its passage into the stenter apparatus and deflecting the web by means of a movable deflector plate into the dump location instead of the stentor apparatus. Pairs of driven nip rollers are preferably located upstream and downstream of the severing station to drive and direct the web through the apparatus. The nip rollers preferably have a rubber facing to facilitate the transportation of the film.

When the malfunction in the stentor has been rectified the web is severed from that passing to dump and the path of the web is deflected into the belt conveyors for feeding into the stentor apparatus as described above.

The unimpeded passage of the web through the apparatus, especially during the threading of a leading edge of web immediately after severing may be ensured by means of suitably arranged guide members and/or air blasts. The guide members may comprise guide plates over which the web is transported. Guide members associated with the pairs of nip rollers may comprise plate members having finger sections or extensions which project into continuous slots in the curved surface of the rollers thereby guiding the film directly into the nip between the rollers.

When such a combination of nip rollers, knife, deflector plate and guide members is employed prior to the belt conveyors, the feeding of the web at the commencement of the process of orientation and heat setting is preferably accomplished through the sets of nip rollers. In such an operation the web may be fed into the nip rollers whilst they are rotated at a slow speed and into the dump location. The speed of the rollers may then be increased so that the linear speed of the web corresponds to the speed of the stenter edge grips before the web is severed and fed into the belt conveyors.

It will be appreciated that the full width of the moving web may be fed simultaneously to the stenter apparatus so that the web leaves the stenter apparatus with a straight leading edge. By contrast, conventional feeding operations often involve manually feeding the web edges independently and in succession to the stentor edge grips on each side of the web. In such an operation, the web initially feeds through the stenter apparatus in a bunched condition before satisfactory web transportaton can be established.

In instances in which the web has insufficient stiffness or modulus to permit it to be fed efficiently through the apparatus according to the present invention the web may be secured to a leader web having properties which enable it to pass unimpeded through the apparatus.

The process and apparatus of the present invention is particularly useful in the production of films of thermoplastics materials and especially in relation to processes for their orientation, heat-setting and/or other process operations. Films of linear polyesters, such as polyethylene terephthalate films, and of polyolefines, such as polypropylene films, may be fed to stenter apparatus by means of the apparatus and process of the present invention in process for their orientation and/or heat-setting and/or other operations such as drying after coating.

A preferred embodiment of the present invention is described below with reference to the accompanying drawings, in which.

Figure 1:
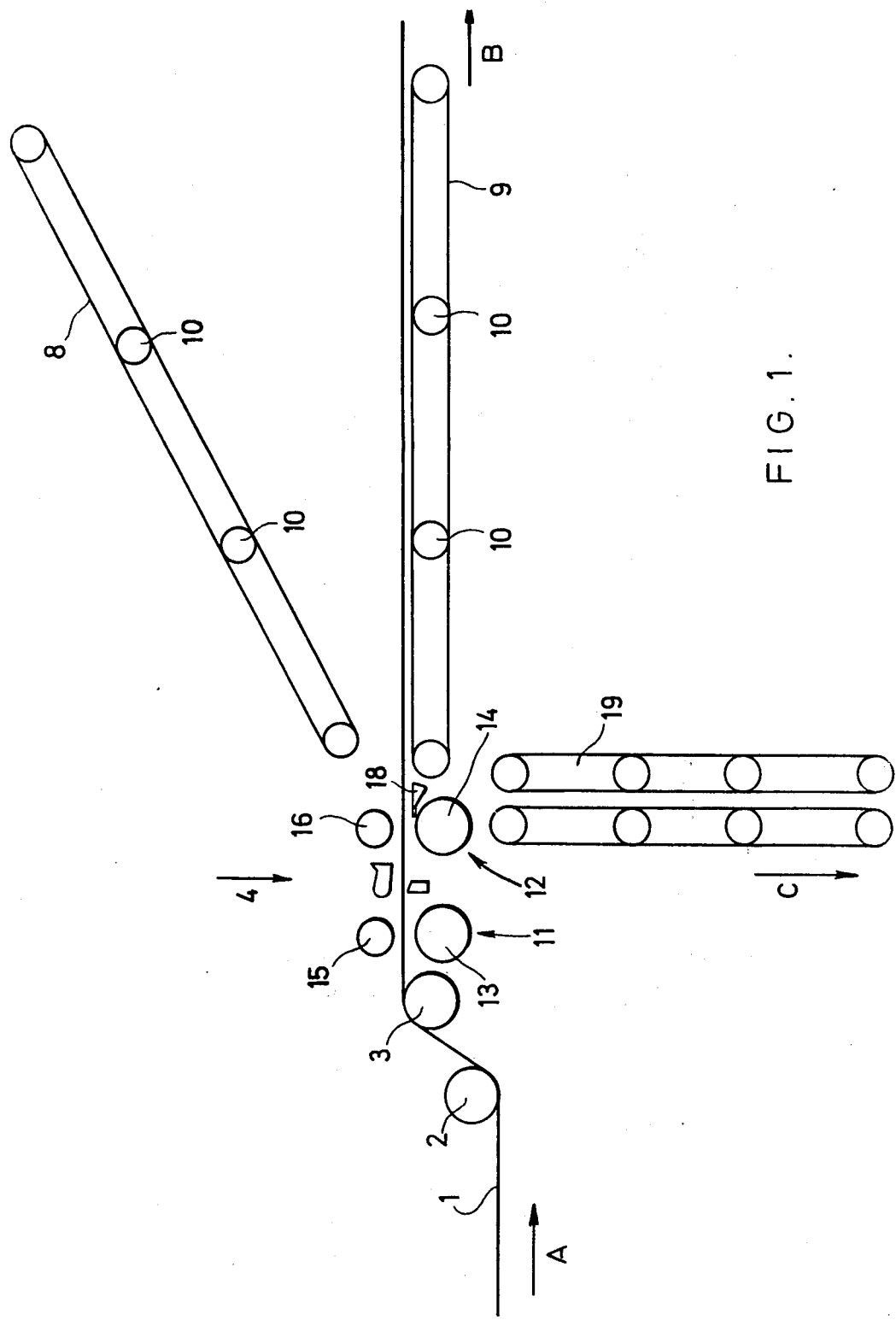
FIGS. 1 to 3 are side elevational views of the feeding apparatus illustrating various stages of the feeding process and web transporting operation.
Figure 2:
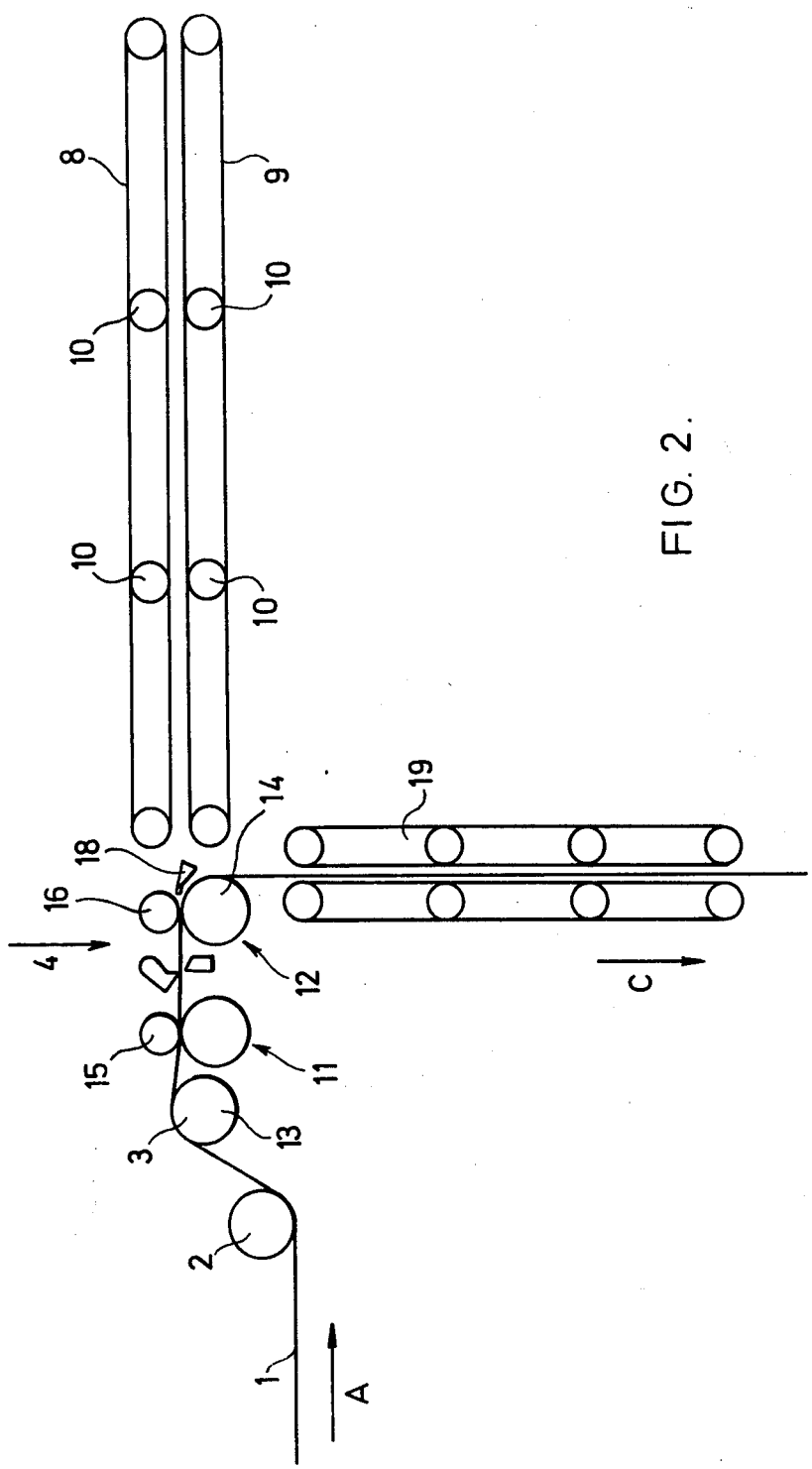
Figure 3:
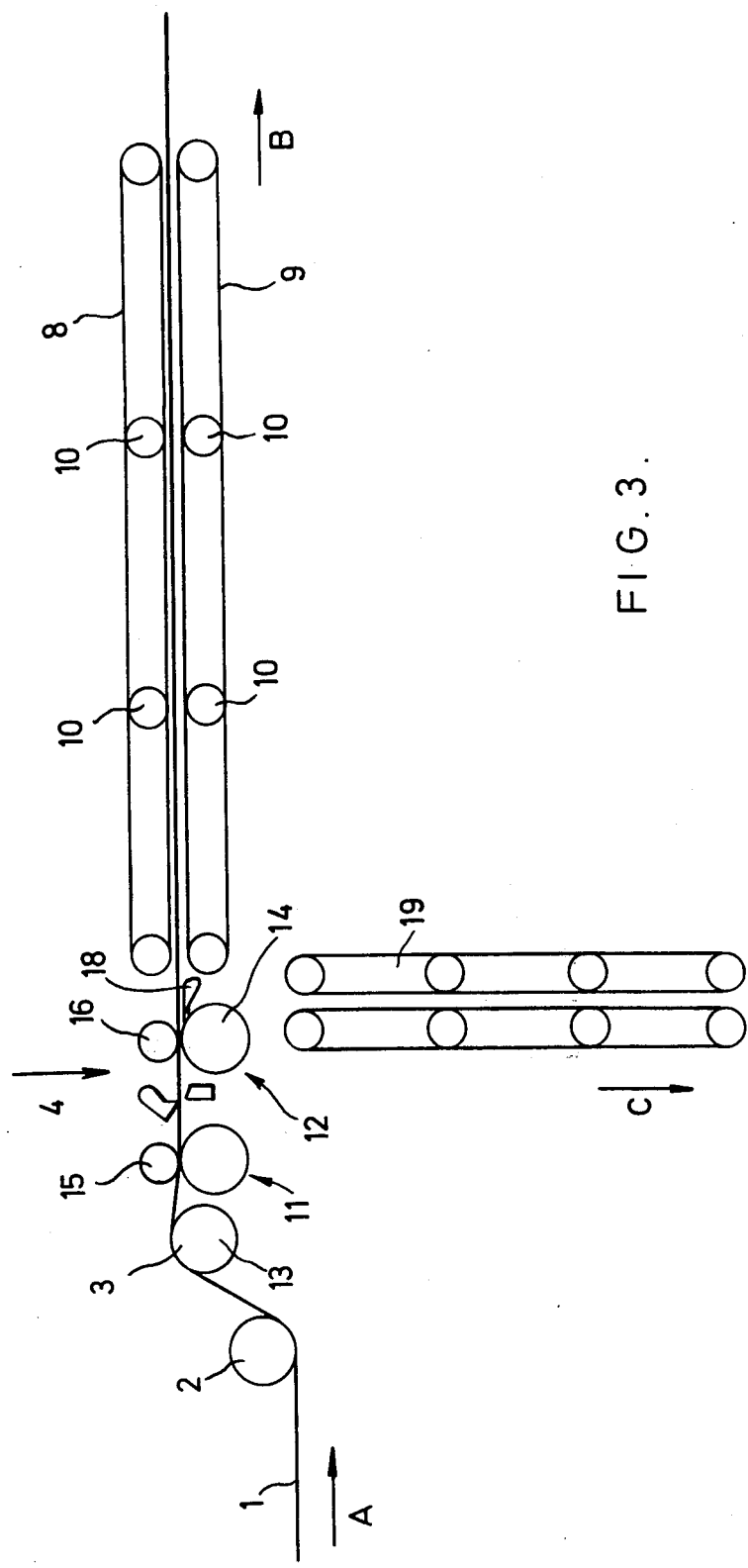

FIGS. 1 to 3 of the drawings illustrate apparatus suitable for feeding a web of a thermoplastics film such as a polyethylene terephthalate film from a proceding manufacturing operation (not illustrated in the drawings) in which the film is oriented longitudinally, i.e. in the direction of its passage through the apparatus, to subsequent operations comprising orientation in the transverse direction followed by heat setting, both operations being effected in stenter apparatus. The longitudinally oriented film 1 is fed to the illustrated apparatus in the direction of the arrow A and into a stenter apparatus in the direction of the arrow B (shown in FIGS. 1, 3 and 5).

Figure 4:
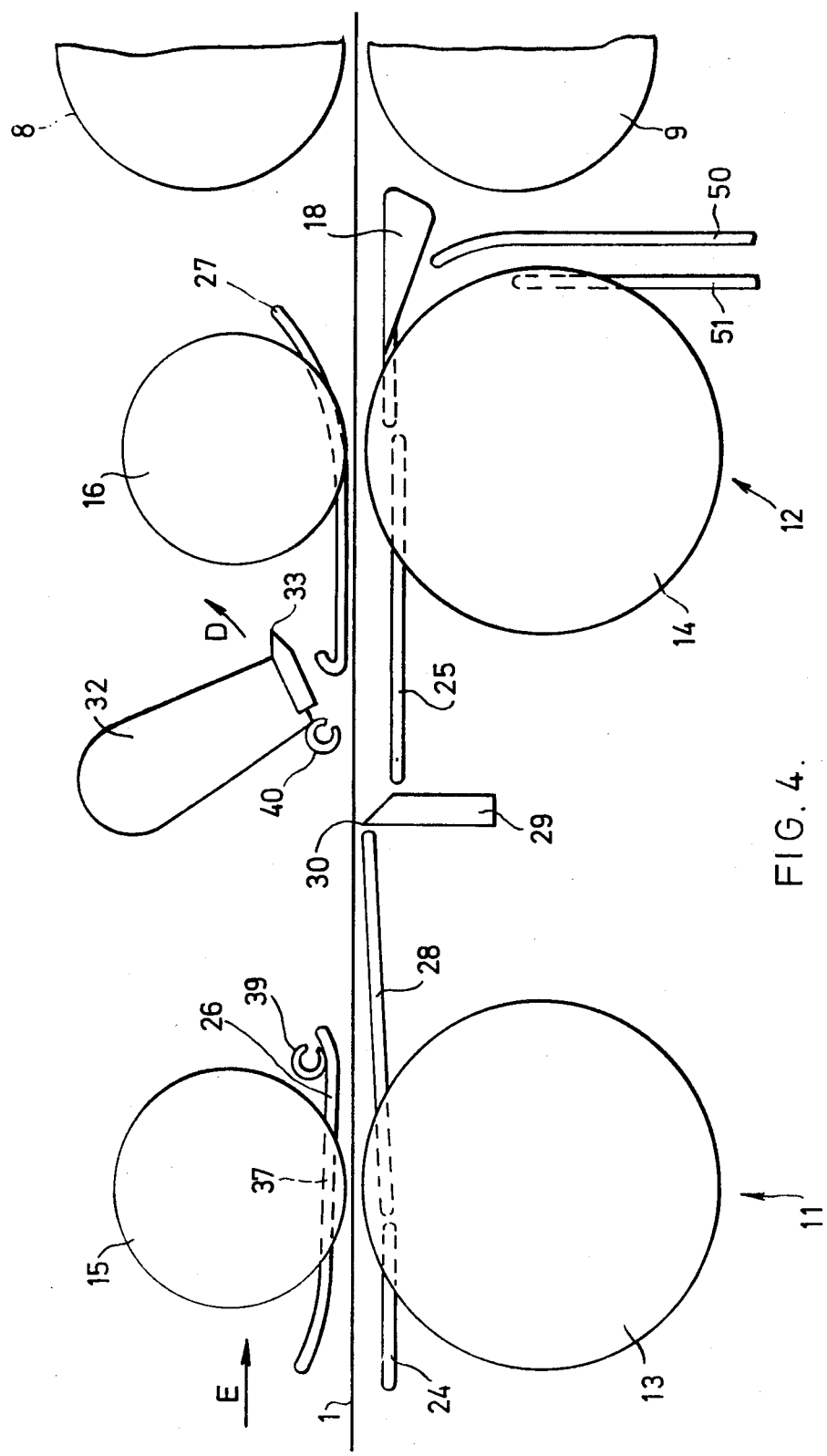
FIG. 4 is an enlarged side elevational view of an intermediate feeding, severing and deflecting assembly which is part of the apparatus illustrated in FIGS. 1 to 3.
Figure 5:
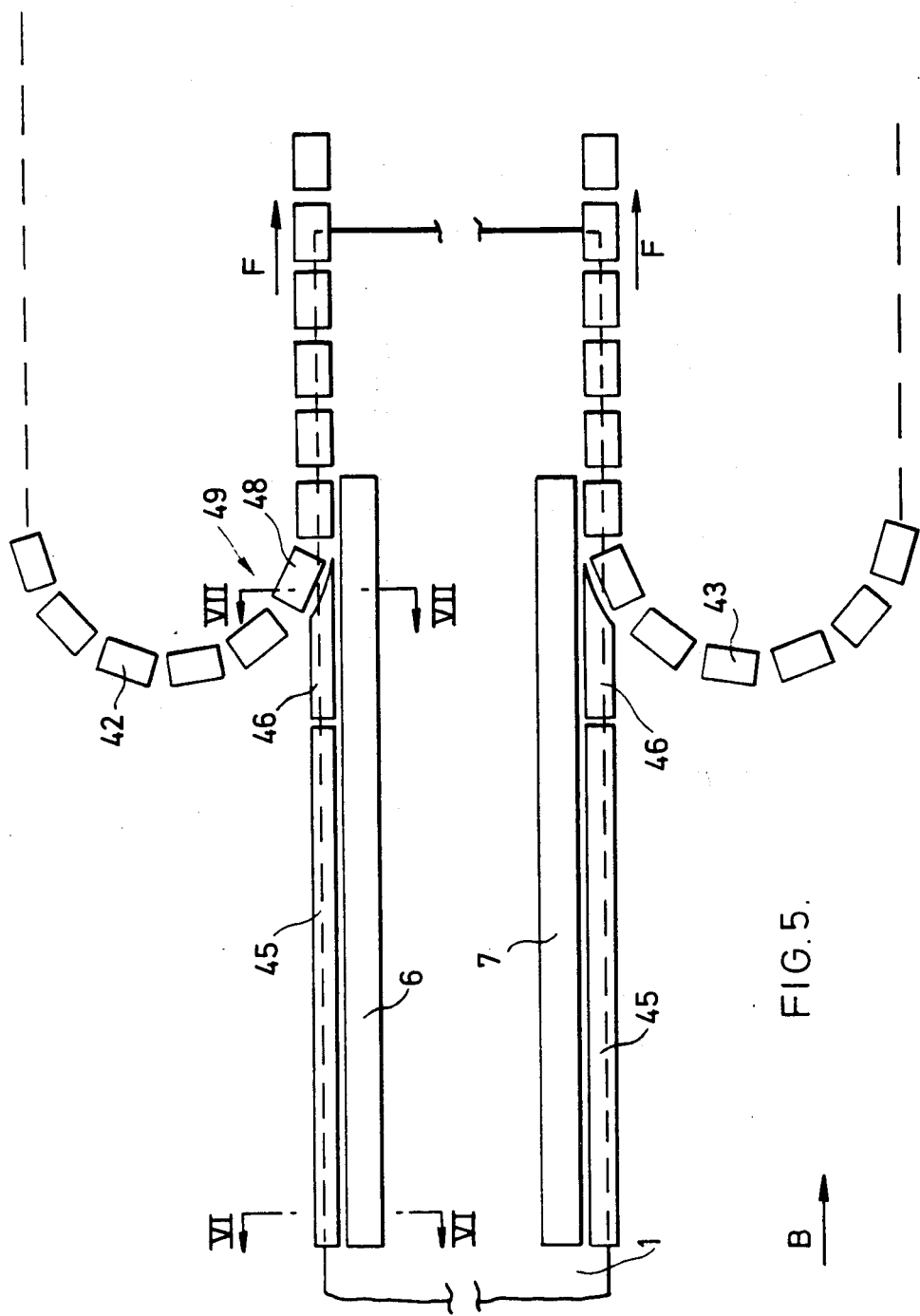
FIG. 5 is a plan view illustrating the apparatus shown in FIGS. 1 to 4 in use for feeding a web to a stenter apparatus.

The longitudinally oriented film 1 is fed over idling rollers 2 and 3 via an intermediate feeding, severing and deflecting assembly, which is indicated generally by reference numeral 4 in FIGS. 1 to 3 and illustrated in greater detail in FIG. 4, into two pairs of driven feeding belt conveyors 6 and 7 located adjacent the edges of the film 1 as illustrated in FIG. 5. Each pair of feeding belt conveyors 6 and 7 comprises an upper conveyor 8 and a lower conveyor 9, about 10 cm wide carried by driven wheels 10, as illustrated in FIGS. 1 to 3.

FIG. 1 of the drawings illustrates the apparatus of the invention in the inoperative state in which the film 1 has already been fed to the stenter apparatus in the direction of the arrow B and is passing continuously from the longitudinal orientation stage to the stenter apparatus. The path of the film through the apparatus is determined by the fixed axis of the idling roller 3 and the clips of the stentor apparatus not shown in FIG. 1. The intermediate feeding, severing and deflecting assembly 4 comprises a set of driven rubber-covered entry nip rollers 11 and a set of driven rubber-covered exit nip rollers 12 of which the lower rollers 13 and 14 respectively have fixed axes whereas the axes of the upper rollers 15 and 16 respectively are movable in the vertical direction from the inoperative position illustrated in FIG. 1 into the feeding position wherein the film is engaged for transport by the roller pairs of the nip rollers 11 and 12 as illustrated in FIGS. 2 to 4. Each lower conveyor 9 has a fixed operative position such that its upper surface is aligned with the plane extending between the top of the nip rollers 13 and 14 whilst each upper conveyor 8 is movable by a hydraulic ram (not illustrated in the drawings) from the inoperative position illustrated in FIG. 1 into engagement with the film and the lower conveyor 9 as illustrated in FIGS. 3 and 4. It will be appreciated, in order to facilitate illustration, that the surfaces of some of the nip rollers and belt conveyors illustrated in the drawings are not illustrated in actual driving contact with the film 1 as required in a practical construction of the invention. The relationship of the components of the apparatus is such that the lowering of the upper rollers 15 and 16 and the upper conveyor 8 depress the film into driving engagement with the lower rollers 13 and 14 and the lower conveyor 9 as illustrated in FIG. 3. Conversely, the raising of the upper roller 15 and 16 and the upper conveyor 8 allows the film 1 to rise clear of the lower rollers 13 and 14 and the lower conveyor 9 by virtue of the transporting tension in the film.

Figure 9:
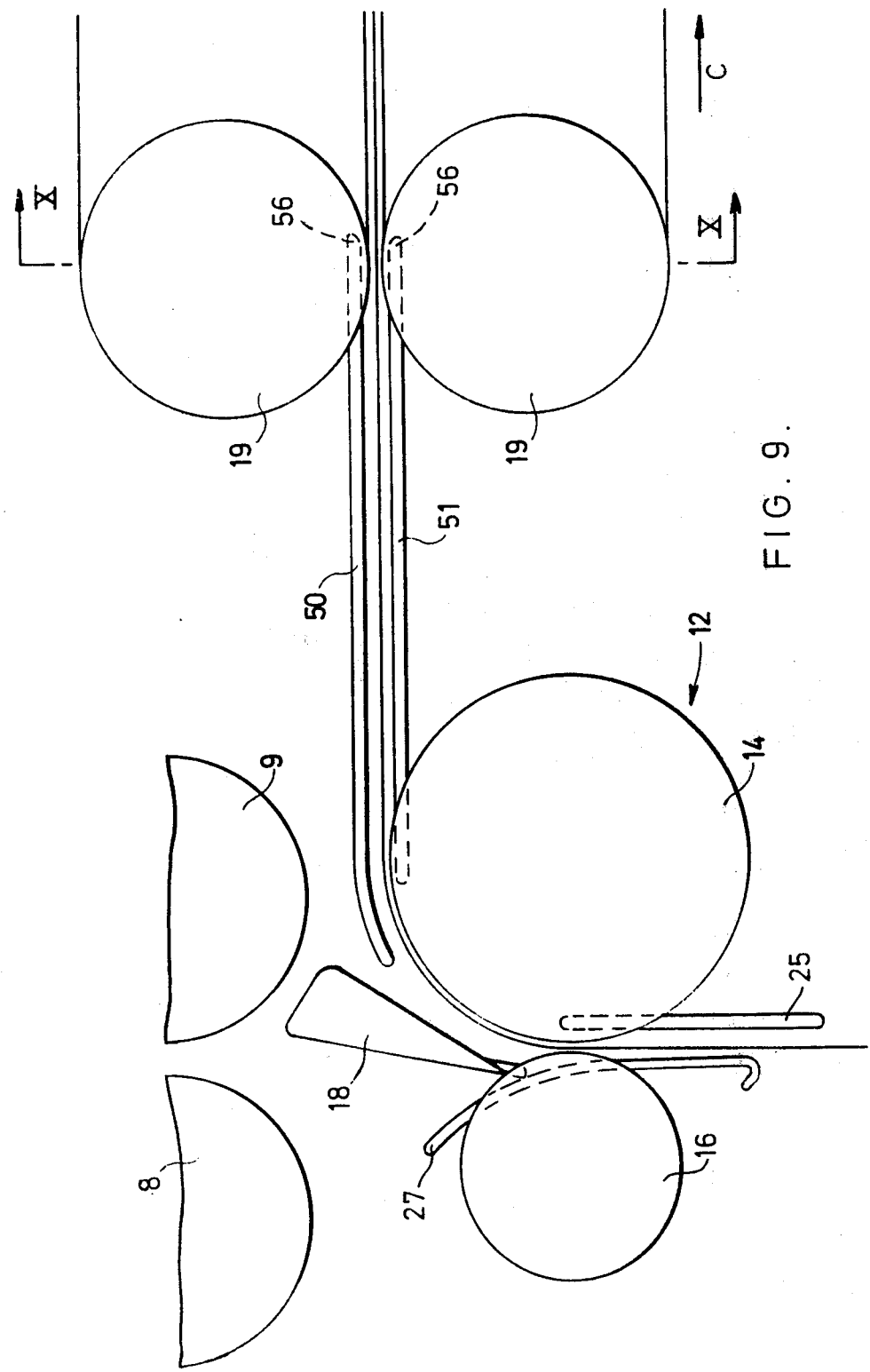
FIG. 9 is an enlarged side elevational view of an assembly feeding to a dump which assembly is part of the apparatus illustrated in FIGS. 1 to 3.

FIGS. 2 and 9 illustrate the film 1 deflected from its normal path through the apparatus by means of a pivotting deflecting plate 18 and being passed through a set of driven dump belt conveyors 19 to a dump in the direction of the arrow C. A cutting device (not illustrated in the drawings) is located at the dump for cutting the film into small pieces suitable for recycling in the film manufacturing process.

The intermediate feeding, severing and deflecting assembly 4 is illustrated in greater detail in FIG. 4 and in particular comprises an assembly of guide members arranged to ensure efficient and unimpeded feeding of the leading edge of the film from the entry nip rollers 11 to the exit nip rollers 12. The guide members include fixed lower guide plates 24 and 25 and fixed upper guide plates 26 and 27. The entry nip rollers 11 are guarded and the guide plates 24 and 26 of sufficient dimension and spacing apart so that no hazard is presented to an operator feeding the film manually into the nip rollers 11. A pivotting guide plate 28 extends between the nip rollers 11 and a static mild-steel knife blade 29 which extends transversely across the film path. The pivotting guide plate 28 is urged by spring means not illustrated in FIG. 4 into the position illustrated to facilitate unimpeded feeding of the leading edge of the film across the cutting edge 30 of the knife blade 29. During the severing operation, the pivotting guide plate 28 is depressed by the movement of a rotary knife 32 having a hardened steel blade in the direction of the arrow D to expose the cutting edge 30 for cutting engagement with the moving cutting edge 33 of the rotary knife 32. The rotary knife 32 is biassed into the stationary position illustrated in FIG. 4 when not in use for severing the film.

Figure 8:
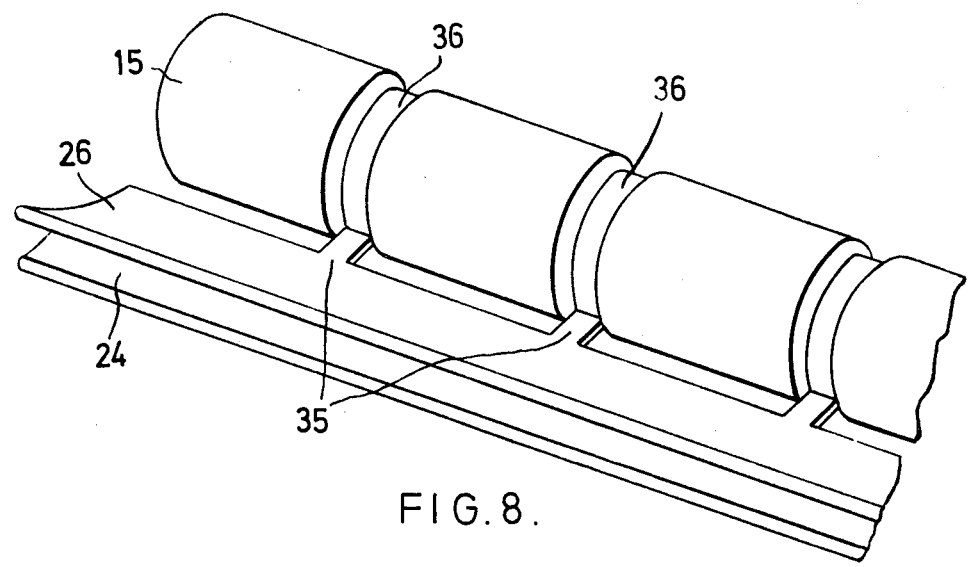
FIG. 8 is a perspective view of one roller of a pair of nip rollers and the associated guide members.

FIG. 8 is a perspective view of the upper roller 13 of the entry nip rollers 11 and the guide plates 24 and 26 viewed in the direction of the arrow E in FIG. 4. The guide plate 26 has cut-out portions providing finger sections 35 which extend through continuous slots 36 in the curved surface of the roller 15. The finger sections are illustrated by broken lines 37 in FIG. 4. The guide plate 27 also has cut-out portions and finger sections extending through the upper roller 16 in a similar manner to that illustrated in FIG. 8. The lower rollers 13 and 14 likewise have slots in their surface into which finger extensions of the guide plates 24, 28 and 25 extend as shown in broken lines in FIG. 4. Additionally the deflecting plate 18 has similar finger extensions running in the slots of the roller 14.

An air knife 39 is mounted upon the guide plate 26 and directs a controlling blast of air along the path of the film through the assembly illustrated in FIG. 4 in order to direct the leading edge of a film during initial feeding into the guide plates 25 and 27. Another air knife 40 is mounted on the rotary knife 32 and supplies an air blast to direct the leading edge of the film into the entry between the guide plates 25 and 27.

Figure 6:
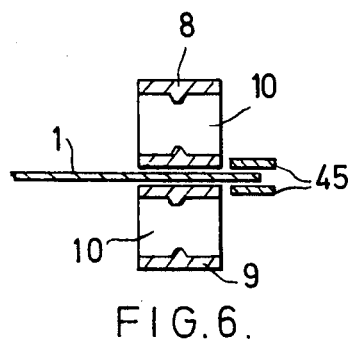
FIG. 6 is a cross-sectional view taken on the line VI—VI of FIG. 5.
Figure 7:
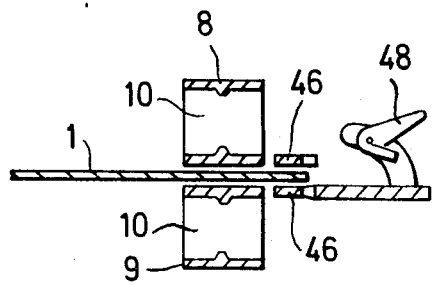
FIG. 7 is a cross-sectional view taken on the line VII—VII of FIG. 5.
Figure 10:
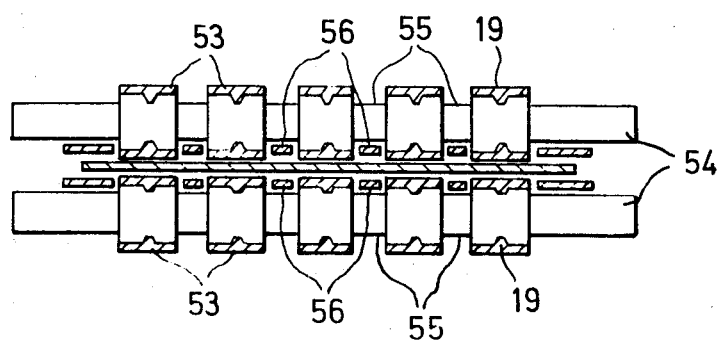
FIG. 10 is a cross-sectional view taken on the line X—X of FIG. 9.

FIG. 5 illustrates the relationship of the belt conveyors 6 and 7 to the stenter apparatus of which some of the edge clamps which are transported around endless tracks are shown schematically at 42 and 43. The edge clamps move in the direction of the arrows F. The exit ends of the belt conveyors 6 and 7 extend into the stenter apparatus and are located inwardly of the stenter edge clamps and spaced 2 cm from them. The edges of the film passing into the stentor apparatus are shown in broken lines in FIG. 5 and are spaced 5 cm from the outer edges of the belt conveyors 6 and 7. Each edge margin of the film extending beyond the belt conveyors 6 and 7 is guided into the edge clamps between pairs of edge guide plates 45 and 46 as illustrated in FIGS. 6 and 7. FIG. 7 illustrates a stenter edge clamp 48 which is held in the open position as it approaches the edge of the film along the converging path 49 of the endless tracks, as shown in FIG. 5.

The assembly for feeding film to dump is illustrated in greater detail in FIG. 9 and as indicated above comprises a set of driven dump belt conveyors 19 which transport the film to the dump in the direction of the arrow C after it has been deflected by pivotting the deflecting plate 18 into the position illustrated in FIG. 9. The path of the film from the exit nip rollers 12 and the deflecting plate 18 to the dump belt conveyors 19 is determined by guide members comprising guide plates 50 and 51 located on each side of the path of the film. Each dump belt conveyor 19 comprises comprises five conveyor belts 53 running on driven mild steel rollers 54. Continuous slots 55 in the curved surface of each roller separate the portions of the rollers which carry the conveyor belts 53. The guide plates 50 and 51 have finger extensions 56 which extend into the slots 55 thereby guiding the film into the dump belt conveyors. These finger extensions 56 are illustrated in broken lines in FIG. 9.

The operation of the apparatus illustrated in the drawings is described below. The apparatus may be used at the commencement of the film production to feed the film into the stenter apparatus thereby establishing a continuous passage of the film through the film-making apparatus. The feeding operation commences with the upper conveyor 8 lowered into driving engagement with the lower conveyor 9, the upper rollers 15 and 16 lowered into driving engagement with the lower rollers 13 and 14, the rotary knife 32 in the inoperative stationary position illustrated in FIG. 4, and the deflecting plate 18 positioned (as shown in FIGS. 2 and 9) to direct the film to dump in the direction of the arrow C via the dump belt conveyors 19.

The film 1 is fed to the apparatus in the direction of the arrow A. During the feeding operation it is convenient to transport the film 1 through the preceding longitudinal stretching apparatus without subjecting the film to stretching thereby enabling the feeding to the film through the apparatus to be accomplished at a slow speed. A conveniently slow driving speed, e.g. about 5 meters per minute is employed to facilitate feeding. Drive is applied to the nip rollers 11, 12 and the dump belt conveyors 19.

The leading edge of the film 1 is fed manually over the idling rollers 2 and 3 and into the nip rollers 11 via the guide plates 24 and 26. The drive transmitted to the film 1 functions to transport the film through the assembly 4 and into the nip rollers 12. Blasts of air from the air knives 39 and 40 ensure an unimpeded passage of the film across the static knife blade and into the guide plates 25 and 27 and as a result into the nip rollers 12. The film issuing from the nip rollers 12 is deflected by the deflecting plate 18 to dump C via the guide plates 50 and 51 and the dump belt conveyors 19.

When threading through the assembly 4 has been achieved with continuous passage of the film to the dump C, the preceding longitudinal stretching apparatus is put into operation under normal production conditions with the result that the speed of the film 1 supplied to the apparatus illustrated in FIG. 2 is increased substantially above that used to accomplish feeding up to the normal production speed. Simultaneously, the speed of the nip rollers 11 and 12 and the dump belt conveyors 19 is increased to correspond substantially with the normal production speed of the film 1. The belt conveyors 6 and 7 are then set into driving motion also substantially at the normal film production speed and the edge clamps 42 and 43 set into motion along the endless tracks of the stenter apparatus also at the normal film production speed.

The film is then severed between the static knife blade 29 and the rotary knife 32 by pneumatically rotating the rotary knife 32 one revolution in the direction of the arrow D at a speed 10% faster than the speed of the film and arresting it after severing in the stationary position illustrated in FIG. 4 so that the air blasts from the air knife 40 directs the leading edge of the severed film between the guide plates 25 and 27 and into the nip rollers 12. Conveniently with the severing of the film, the deflecting plate 18 is pivotted into the position illustrated in FIG. 4 and as a result depressing the film passing to dump into the grooves in the roller 14 by means of the finger extensions associated with the deflecting plate 18. The drive imparted by the dump belt conveyors 19 to that part of the film passing to dump is sufficient to overcome the resistance to motion created in this way. The driving speed imposed by the dump belt conveyors 19 upon the severed film passing to dump is slightly greater than that imposed by the nip rollers 11 on the leading portion of the severed film such that the trailing and leading edges of the film separate slightly before reaching the finger extensions of the deflecting plate 18. This ensures that the finger extensions of the deflecting plate 18 recede completely into the grooves of the roller 16 before the leading edge of the severed film reaches the vicinity of the nip. The leading edge of the film is driven across the deflecting plate 18 and directed into the belt conveyors 6 and 7 and then into the edge clamps 42 and 43 of the stenter apparatus, the edge guide plates 45 and 46 serving to guide the edge margins of the film into the edge clamps 42 and 43.

When satisfactory passage of the film to the stenter apparatus has been achieved, the upper rollers 15 and 16 and the upper conveyor 8 are retracted from driving engagement with the film and their respective lower rollers 13 and 14 and the lower conveyor 9 permitting the tension in the film to lift the film off the lower rollers 13 and 14 and the lower conveyor 9 as illustrated in FIG. 1.

Whenever a malfunction such as film splitting occurs in the stenter apparatus, the apparatus illustrated in the drawings may be used to re-establish satisfactory continuous passage of the film through the stenter apparatus. The sequence of operations required for this purpose may be initiated automatically by a suitable split detector located in the stenter apparatus.

The upper rollers 15 and 16 are lowered into driving engagement with the lower rollers 13 and 14 respectively and the longitudinally stretched film is severed between the static knife blade 29 and the rotary knife 32 which is rotated one revolution in the direction of the arrow D and arrested after severing in the stationary position illustrated in FIG. 4 as described above. Concurrently with the severing of the film, the deflecting plate 18 is pivotted into the position shown in FIGS. 2 and 9 in order to deflect the path of the leading edge of the severed film and transport the film to the dump in the direction of the arrow C. The film is passed continuously to dump whilst the malfunction in the stentor apparatus is rectified thereby eliminating any interference with the established longitudinal stretching conditions.

When the split film has been removed from the stenter apparatus and the apparatus is able to accept film, the upper conveyor 8 is lowered into driving engagement with the lower conveyor 9 and the stentor edge clamps 42 and 43 are driven at normal production speed around the endless tracks.

Using the same sequence of operations described above, the film is severed by means of the rotary knife 32 and its path deflected from the dump C into the belt conveyors 6 and 7 for feeding into the edge clamps 42 and 43 of the stentor apparatus in the direction of the arrows B and F.

When the film is passing satisfactorily into the stenter apparatus, the upper rollers 15 and 16, the upper conveyor 8 and the roller 21 are retracted from driving engagement with their respective rollers and conveyor thereby permitting continuous passage of the film through the stenter apparatus to be established.

We claim:

1. A process for initially introducing a moving web into a stenter apparatus which includes linearly moving edge grips, utilizing at least one belt conveyor located on one side of the moving web and at least one other belt conveyor located on the other side of the moving web, the process comprising the steps of gripping and transporting the web between the at least one belt conveyor and the at least one other belt conveyor, driving the belt conveyors at a linear speed substantially equal to the linear speed of the stenter apparatus edge grips, transferring the moving web into the moving edge grips of the stenter apparatus, said gripping and transporting step being accomplished by extending the belt conveyors into the stenter apparatus and located inwardly of the paths of the edge grips of the stenter apparatus, the edge margins of the web extending beyond the edges of the belt conveyors during transferring of the moving web into the moving edge grips of the stenter apparatus; and disengaging the belt conveyors from gripping and transporting contact with the moving web once continuous web transportation through the stenter apparatus has been established.

2. A process as recited in claim 1 wherein said gripping and transporting step is accomplished by providing as each of the at least one belt conveyor and the at least one other belt conveyor a pair of belt conveyors located above and below the web, and gripping the web adjacent its edges by both pairs of belts, above and below the web.

3. A process as recited in claim 1 comprising the further step of guiding the edge margins of the web which extend beyond the edges of the belt conveyors up to the entry of the web into the stenter edge grips, said guiding being accomplished by providing guide plates adjacent the edge margins.

4. A process as recited in claim 1 wherein said disengaging step is accomplished by retracting the at least one conveyor from the web and permitting the web to lift out of engagement with the other belt conveyor under the tension in the web.

5. A process as recited in claim 1 comprising the further step of prior to the transferring of the moving web into the moving edge grips of the stenter apparatus, temporarily deflecting the path of the web to a dump location.

6. A process as recited in claim 5 comprising the further steps of severing a previously established continuous passage of the web through the stenter apparatus, and deflecting it to the dump location prior to the introduction of the moving web again into the stenter apparatus.

7. A process as recited in claim 6 comprising the further step of severing the web passing to the dump location, and deflecting it into operative association with the belt conveyors for feeding into the stenter apparatus.

* * * * *